INVENTOR.
R. A. HALLAHAN, JR.
BY Young & Quigg
ATTORNEYS

United States Patent Office 3,504,269
Patented Mar. 31, 1970

3,504,269
CONSTANT CURRENT POWER SUPPLY
Richard A. Hallahan, Jr., Bartlesville, Okla., assignor to Phillips Petroleum Company, a corporation of Delaware
Filed Feb. 21, 1968, Ser. No. 707,125
Int. Cl. H02m 1/08
U.S. Cl. 321—18                              8 Claims

ABSTRACT OF THE DISCLOSURE

One terminal of an electrochemical cell, which has a variable resistance under load, is connected through rectifiers to the end terminals of the secondary coil of a transformer. The other terminal of the cell is, connected through silicon controlled rectifiers to two intermediate terminals on the transformer secondary coil. Each silicon controlled rectifier is provided with a triggering circuit and a synchronizing circuit. The triggering circuits are actuated at a point during a cycle, the time of the point being variable over 360° by a controller responsive to a measurement of the current through the cell.

---

Certain electrical loads, for example an electrochemical cell, exhibits variations in resistance during operation. The use of conventional power supplies having a constant voltage result in changes in the level of electrical current corresponding with variations in resistance. Furthermore, many of the power supplies were controllable only over a relatively narrow range.

Accordingly, it is an object of the invention to provide a new and improved power supply. It is an object of the invention to provide a power supply capable of maintaining a constant load current desite variations in load impedance. An object of the invention is to provide a power supply having a wide range of control.

Other objects, aspects and advantages of the invention will be apparent from a study of the specification, drawings and the appended claims to the invention.

Figure 1:
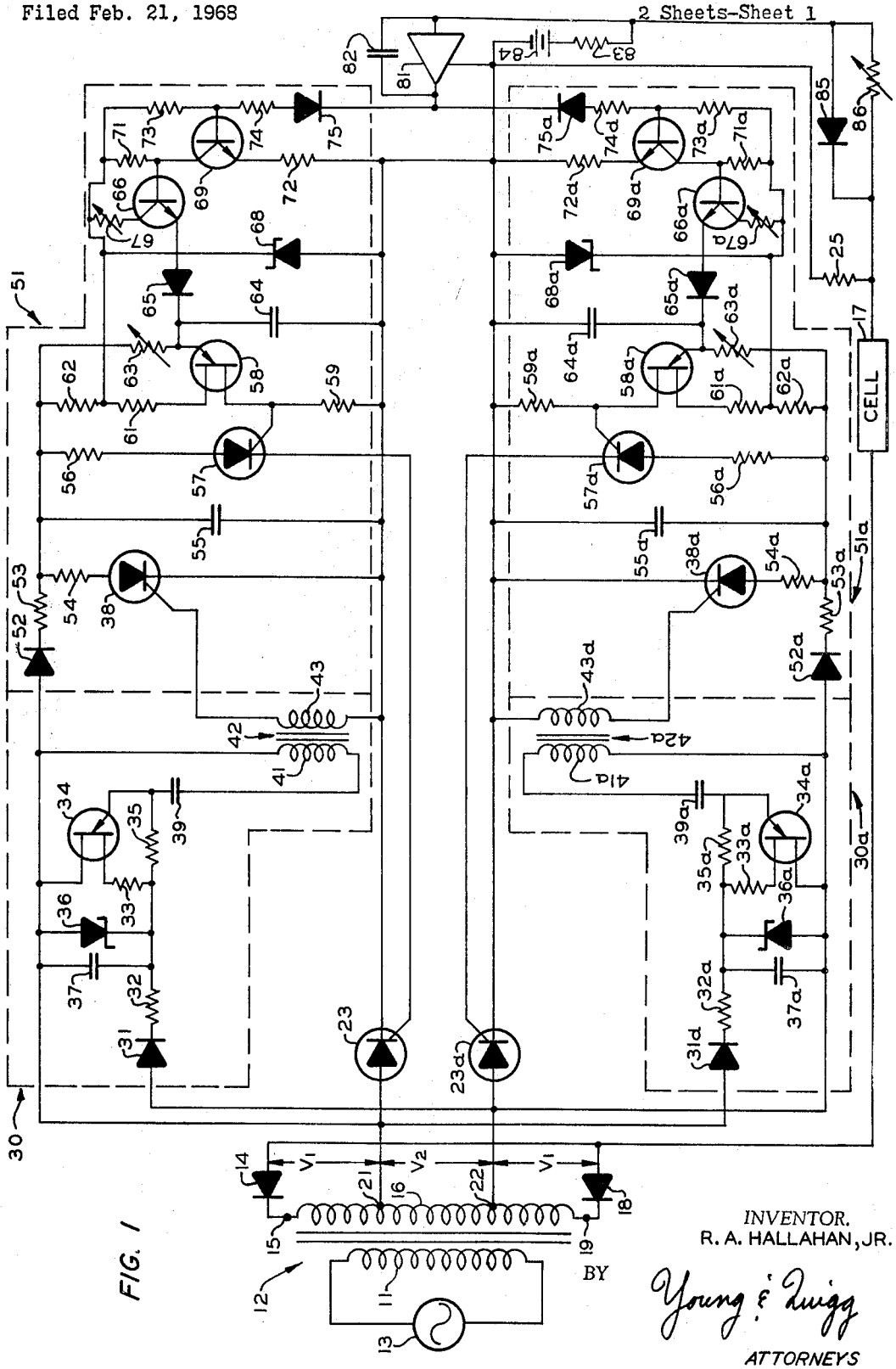
Figure 2:
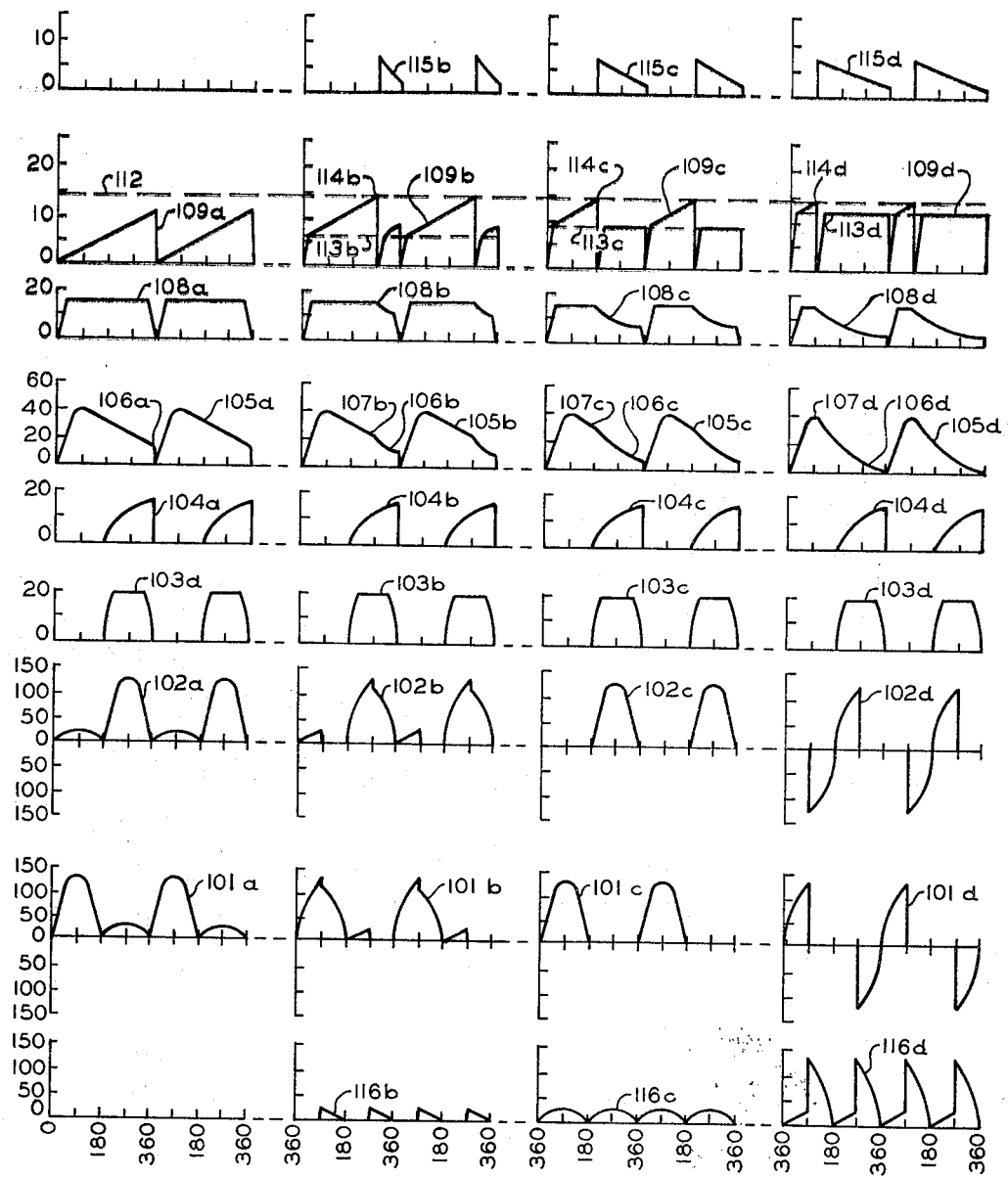

In the drawings FIGURE 1 is a schematic representation of a power supply in accordance with the invention, and FIGURE 2 is a graphical representation of waveforms occurring in the system of FIGURE 1 under different load requirements.

Referring now to the drawings and to FIGURE 1 in particular, the primary coil 11 of a transformer 12 is connected between the terminals of an alternating current voltage source 13. The cathode of diode 14 is connected to a first end terminal 15 of the secondary coil 16 of transformer 12, while the anode of diode 14 is connected to a first power input terminal of electrochemical cell 17. The cathode of diode 18 is connected to the second end terminal 19 of secondary coil 16 while the anode of diode 18 is connected to the first power input terminal of cell 17. Coil 16 is provided with a first intermediate terminal 21 and a second intermediate terminal 22. Terminals 21 and 22 are so located that the voltage between terminal 15 and terminal 21 is V1, the voltage between terminals 19 and 22 is also V1, and the voltage between terminals 21 and 22 is V2.

The anode of silicon controlled rectifier (SCR) 23 is connected to terminal 21, and the anode of SCR 23a is connected to terminal 22. Each of SCR 23 and SCR 23a is provided with a control trigger circuit and a synchronous circuit. As these are identical for the SCR 23 and SCR 23a, for purposes of simplicity, the control trigger circuit and synchronous circuit for SCR 23 will be described and the corresponding elements of the trigger and synchronizing circuits for SCR 23a will be designated by the corresponding number followed by the letter a.

The cathodes of SCR 23 and SCR 23a are connected through resistor 25 to the second power input terminal of cell 17. Diodes 14 and 18 serve as rectifiers to prevent negative D.C. voltages from appearing across the combination of load 17, SCR 23 and SCR 23a. The voltage at terminal 21 with respect to common (anodes of diodes 14 and 18) will have a maximum of +V1 +V2 during the first half cycle and a maximum of +V1 during the second half cycle, and will equal the voltage drop across cell 17, resistor 25 and SCR 23. Similarly the voltage at terminal 22 with respect to common will have a maximum of +V1 during the first half cycle and a maximum of +V1 +V2 during the second half cycle and will equal the voltage drop across cell 17, resistor 25 and SCR 23a.

In the synchronous circuit 30, diode 31 is a half-wave rectifier with the anode thereof connected to terminal 22. The cathode of diode 31 is connected through resistor 32 and resistor 33 to the positive or second base terminal of unijunction transistor 34. Resistor 35 is connected between the emitter of transistor 34 and the junction between resistors 32 and 33. The first or negative base terminal of transistor 34 is connected to terminal 21. Zener diode 36 is connected between terminal 21 and the junction between resistors 32 and 33 to clip the half-wave form of voltage V2 passed by diode 31 to a desired value, for example on the order of 20 volts. Capacitor 37 is connected in parallel with Zener diode 36 to prevent transients from triggering SCR 38. Capacitor 39 and the primary coil 41 of transformer 42 are connected in series between the emitter of transistor 34 and terminal 21. The secondary coil 43 of transformer 42 is connected between the cathode of SCR 38 and the trigger of SCR 38. The cathode of SCR 38 is also connected to the cathode of SCR 23. Capacitor 39 and resistor 35 constitute an RC network with capacitor 39 being charged while transistor 34 is nonconducting. When the voltage at the emitter of transistor 34 reaches a predetermined fraction, called the intrinsic standoff ratio, of the voltage between the first and second base terminals thereof, transistor 34 starts conducting between the emitter and the first, or negative, base terminal, and continues such conduction until the current flow therethrough falls below a certain value called the minimum holding current. The conduction by transistor 34 discharges capacitor 39, causing a voltage pulse in primary coil 41, with the corresponding pulse in secondary coil 43 triggering SCR 38. The values of resistor 35 and capacitor 39 are selected so that the voltage across capacitor 39 does not achieve the intrinsic standoff ratio during the time period of the clipped positive half-wave pulse passed by diode 31 and Zener diode 36. However, at the trailing edge of the clipped positive half-wave pulse, the voltage between the two base terminals drops while the voltage at the emitter remains the same, thus causing the attainment of the intrinsic standoff ratio and the subsequent discharge of capacitor 39 only at a predetermined point on the trailing edge of each clipped positive half-wave pulse, thereby synchronizing the firing of SCR 38 and SCR 38a at the same point in the respective half cycle. In other words, capacitor 39 is discharged at a particular point in alternate half cycles and capacitor 39a is discharged at the corresponding point in the other half cycles. This deactivates the trigger circuit 51 (or 51a).

In the trigger circuit 51, the anode of diode 52 is connected to terminal 21 while the cathode of diode 52 is connected through limiting resistor 53 and resistor 54 to the anode of SCR 38. The positive voltage across SCR 38 will have a peak of V1+V2 during one half cycle and a peak of V1 during the second half cycle when neither of SCR 23 and SCR 23a is conducting. Diode 52 does not pass negative voltages which occur across SCR 23 when SCR 23a is conducting. Capacitor 55 is connected between the cathode of SCR 38 and the junction between resistors 53 and 54 to charge to a voltage representing the peak voltage occurring during the cycle. Diode 52 prevents capacitor 55 from discharging back into terminal 21 after the peak voltage has occurred. Resistor 56 is connected between the anode of SCR 57 and the junction between resistors 53 and 54, while the cathode of SCR 57 is connected to the trigger terminal of SCR 23. The trigger terminal of SCR 57 is connected to the first, or negative, base terminal of unijunction transistor 58 and through resistor 59 to the cathode of SCR 23. Resistors 61 and 62 are connected in series between the second, or positive, base terminal of transistor 58 and the junction between resistors 53 and 54. A variable resistor 63 is connected between the emitter of transistor 58 and the junction between resistors 53 and 54, while capacitor 64 is connected between the emitter of transistor 58 and the cathode of SCR 23.

Resistor 63 and capacitor 64 form the RC circuit for the emitter of transistor 58. When the intrinsic standoff ratio is achieved, transistor 58 conducts between the first, or negative, base terminal and the emitter to discharge capacitor 64. The values of resistor 63 and capacitor 64 are selected to cause the "ramp" charging rate of capacitor 64 responsive to the voltage pulse produced across capacitor 55 to be insufficient, of itself, to achieve the intrinsic standoff ratio prior to the discharge of capacitor 55. Zener 68 is connected between the cathode of SCR 23 and the junction between resistors 61 and 62 to clip to a desired level, for example 20 volts, the voltage pulse produced by the charging of capacitor 55. The cathode of diode 65 is connected to the emitter of transistor 58 with the anode of diode 65 being connected to the emitter of transistor 66. Variable resistor 67 is connected between resistors 61 and 62. The base of transistor 66 is connected to the collector of transistor 69 and through resistor 71 to the junction between resistors 61 and 62. Resistor 72 is connected between the emitter of transistor 69 and the cathode of SCR 23. The base of transistor 69 is connected through resistor 73 to the junction between resistors 61 and 62, and through resistor 74 to the anode of diode 75. The cathodes of diodes 75 and 75a are connected to the output of operational amplifier 81. Capacitor 82 is connected between the output of amplifier 81 and the inverting input thereof. Resistor 83 and D.C. voltage sources 84 are connected in series between the inverting input of amplifier 81 and the reference input of amplifier 81, the latter being connected to the cathodes of SCR 23 and SCR 23a. The anode of diode 85 is connected to the input of amplifier 81, the cathode of diode 85 being connected to the second power input terminal of load 17. Variable resistor 86 is connected in parallel with diode 85. Amplifier 81 thus serves as an integrating amplifier with capacitor 82 effecting the integration of the current produced by the algebraic sum of the voltage across battery 84 and resistor 83 and the voltage across resistor 83 and the voltage across resistors 25 and 86. Amplifier 81 can be considered as a controller with battery 84 and resistors 83 and 86 constituting the set-point input and resistor 25 being the measurement input. Resistor 25 produces a voltage representative of the current through cell 17 and constitutes the actual measurement, resistor 86 being a scaling resistor which is adjustable to produce the desired current through cell 17. Diode 85 is a germanium diode which serves to reduce the current through resistor 86 if high peak currents are drawn. The voltage at the output of amplifier 81, which is applied to the cathodes of diodes 75 and 75a determines the point at which the triggering circuits actuate the SCR 23 and SCR 23a.

The current through cell 17 is measured by utilizing the voltage drop across resistor 25. This voltage is employed in the measurement input of amplifier 81 to produce an output control signal at the cathodes of diodes 75 and 75a. Transistors 69 and 66 and their associated elements serve as a two stage amplifier for this control signal, with transistor 66 being connected as an emitter follower to have a low impedance. The amplified control signal is applied through diode 65 to the emitter of unijunction transistor 58 to provide a "pedestal" charge on capacitor 64. The low impedance of the amplifier output permits capacitor 64 to charge at a very rapid rate to produce the substantially uniform height "pedestal" as opposed to the continuously increasing height of the "ramp" voltage produced on capacitor 64 due to the clipped version of the voltage on capacitor 55. The "ramp" and "pedestal" voltages are combined where there is an amplified control signal. The ramp increases at a substantially uniform rate due to the constant amplitude of the clipped pulse, while the height of the pedestal varies with the amplitude of the amplified control signal. Unijunction transistor 58 conducts to discharge capacitor 64, and thus to trigger SCR 57, wherever the combined ramp and pedestal voltage is sufficient to achieve the intrinsic standoff ratio for transistor 58.

Referring now to FIGURE 2, there are illustrated four sets, each covering two cycles, of the waveforms for various elements. The four sets correspond to the firing of SCR 23 at 360° (nonconducting), 270°, 180° and 90° and SCR 23a at 180°, 90°, 360° and 270° on the same time scale. Curves 101a, 101b, 101c and 101d represent the voltage across SCR 23 for each of the four sets, while curves 102a, 102b, 102c and 102d represent the voltage across SCR 23a. The clipped half-wave voltage between the base terminals of transistor 34 is represented by waveforms 103a, 103b, 103c and 103d, while the voltage across capacitor 39 is represented by waveforms 104a, 104b, 104c and 104d. The voltage across a capacitor 55 is represented by waveforms 105a, 105b, 105c and 105d. The voltage between the base terminals of transistor 58 is represented by waveforms 108a, 108b, 108c and 108d; the voltage across capacitor 64 being represented by waveforms 109a, 109b, 109c and 109d.

In the first set, the amplifier composed of transistors 66 and 69 has a zero output, so that waveform 104a represents only the "ramp" voltage due to the charging of capacitor 55. The peak of the "ramp" voltage 109a is below the value 112 required to achieve the intrinsic standoff ratio. Thus capacitor 55 is discharged at point 106a due to the trailing edge of the voltage across the base terminals of transistor 34. Point 106a is substantially at 360°, so there is no trigger current to SCR 23 (or SCR 23a) and no current in cell 17.

In the second set, the amplifier composed of transistors 66 and 69 produces a pedestal, represented by the portion of waveform 109b below the line 113b. The ramp voltage is superimposed on the pedestal and the resultant waveform crosses values 112 at point 114b, which is at 270° in the cycle. The resultant conduction of transistor 58 increases the discharging of capacitor 55, as represented by the drop in waveform 105b following point 107b, and fires SCR 57. Capacitor 39 is discharged at point 106b to cause SCR 38 to conduct to finish discharging capacitor 55. The conduction by SCR 57 results in the flow of current, represented by waveform 115b, to the trigger of SCR 23 to fire SCR 23. The conduction of SCR 23 eliminates the V1 component from the last quarter of the cycle as illustrated by waveforms 101b. The conduction SCR 23a eliminates the V1 component across SCR 23 during the second quarter of the cycle. The resulting voltage across cell 17 is represented by waveform 116b.

In the third set, the amplified control signal produces a pedestal having the amplitude represented by line 113c, causing transistor 58 to conduct at point 114c, with the trigger current to SCR 23 being represented by waveforms 115c. This eliminates the V1 component during the entire cycle, leaving only the positive half cycles of V2 across SCR 23. The resultant voltage across cell 17 is represented by waveform 116c. In the fourth set, the amplified control signal produces a pedestal having an amplitude represented by line 114d. The trigger current to SCR 23 is represented by waveforms 115d and causes conduction of SCR 23 during the last three quarters of each cycle. The voltage across SCR 23 and cell 17 are represented by waveforms 101d and 116d. The waveforms for each of the elements of the current for SCR 23a would be the same as those shown for the elements of the current for SCR 23, but 180° out of phase. If SCR 23 and SCR 23a were triggered immediately after 0° and 180°, respectively, both SCR 23 and SCR 23a would conduct for substantially the entire cycle, producing a full wave rectified sine wave across cell 17 having a peak voltage of substantially V1 and V2 for each half cycle. This represents the condition for maximum power to cell 17, whereas the first set in FIGURE 2 represents the minimum power to cell 17.

Regardless of the variation in the impedance of cell 17, the current through cell 17 is measured by the voltage drop across reactor 25, which is utilized by the operational amplifier 81 to vary the time during the cycle at which SCR 23 and SCR 23a are fired, to thereby vary the voltage across cell 17 to maintain the current through cell 17 substantially constant at the desired valve therefor.

I claim:

1. Apparatus comprising a transformer having a primary coil and a secondary coil, said secondary coil having first and second intermediate terminals and first and second end terminals, a source of alternating current connected between the end terminals of said primary coil, first and second half-wave rectifiers connected back to back in series between said first and second end terminals of said secondary coil, a load having first and second power input terminals, means connecting said first power input terminal to the junction between said first and second half-wave rectifiers, first and second silicon controlled rectifiers connected back to back in series between said first and second intermediate terminals, a resistor connected between second power input terminal and the junction between said first and second silicon controlled rectifiers, a first trigger circuit connected to the trigger terminal of said first silicon controlled rectifier, a second trigger circuit connected to said second silicon controlled rectifier, a first synchronous current means connected to said first trigger circuit to deactuate said first trigger circuit at the end of alternate half cycles, a second synchroous circuit means connected to said second trigger circuit to deactuate said second trigger current at the end of the remaining alternate half cycles, control means for actuating said first and second trigger circuits at a variable time during each cycle to cause said first and second silicon controlled rectifiers to conduct for a period of time representative of the voltage across said resistor.

2. Apparatus in accordance with claim 1 wherein each of said first and second synchronous circuit means comprises a first unijunction transistor having first and second base terminals and an emitter; means connecting said first base terminal to a first one of said first and second intermedite terminals of said secondary coil; second and third resistors and a third half-wave rectifier; means connecting said second and third resistors in series between said second base terminal and one terminal of said third half-wave rectifier; means connecting the second terminal of said third half-wave rectifier to the second one of said first and second intermediate terminals of said secondary coil; a fourth resistor connected between emitter and the junction between said second and third resistors; a second transformer having a primary coil and a secondary coil; a capacitor; means connecting said capacitor and said primary coil of said second transformer in series between said emitter and said first base terminal; and means connecting said secondary coil of said second transformer to the respective one of said first and second trigger circuits.

3. Apparatus in accordance with claims 1 wherein each of said first and second trigger circuits comprises a third silicon controlled rectifier having first and second terminals and a trigger terminal; means connecting said first terminal of said third silicon controlled rectifier to the trigger terminal of the respective one of said first and second silicon controlled rectifiers; a third half-wave rectifier; second and third resistors connected in series between said second terminal of said third silicon controlled rectifier and one terminal of said third half-wave rectifier; means connecting the second terminal of said third half-wave rectifier to the respective one of said first and second intermediate terminals to which the respective one of said first and second silicon controlled rectifiers is connected; a first capacitor connected between the junction of said first and second silicon controlled rectifiers and the junction of said second and third resistors; a fourth resistor; a unijunction transistor having first and second base terminals and an emitter; means connecting said first base terminal to said trigger terminal of said third silicon controlled rectifier and through said fourth resistor to the junction of said first and second silicon controlled rectifiers; a fifth resistor connected between said second base terminal and the junction between said second and third resistors, a second capacitor connected between said emitter and said junction between said first and second silicon controlled rectifiers; a sixth resistor connected between said emitter and said junction between said second and third resistors; and means responsive to said control means for applying a control signal to said emitter.

4. Apparatus in accordance with claim 3 wherein each of said first and second synchronous circuit means comprises a second unijunction transistor having first and second base terminals and an emitter; means connecting said first base terminal of said second unijunction transistor to a first one of said first and second intermediate terminals of said secondary coil; sixth and seventh resistors and a fourth half-wave rectifier; means connecting said sixth and seventh resistors in series between said second base terminal of said second unijunction transistor and one terminal of said fourth half-wave rectifier, means connecting the second terminal of said fourth half-wave rectifier to the second one of said first and second intermediate terminals of said secondary coil; an eighth resistor connected between said emitter of said second unijunction transistor and the junction between said sixth and seventh resistors; a second transformer having a primary coil and a secondary coil; a third capacitor; means connecting said third capacitor and said primary coil of said second transformer in series between said emitter of said second unijunction transistor and said first base terminal of said second unijunction transistor; and wherein each of said first and second trigger circuits further comprises a fourth silicon controlled rectifier and a ninth resistor connected in series between the junction of said first and second silicon controlled rectifiers and the junction of said second and third resistors; and means for connecting said secondary coil of said second transformer between the trigger terminal of said fourth silicon controlled rectifier and the junction between said first and second silicon controlled rectifiers.

5. Apparatus in accordance with claim 4 wherein said control means comprises an operational amplifier having an inverting input, a reference input, and an output; means for applying a reference voltage between said inverting input and said reference input; a fourth capacitor connected between said inverting input and said output; means for connecting said first resistor between said reference input and said inverting input, a second amplifier connected between said output of said operational amplifier and said emitter of said first unijunction transistor of said first trigger circuit, and a third amplifier connected between said output of said operational amplifier and said emitter of said first unijunction transmitter of said second trigger circuit.

6. Apparatus in accordance with claim 5 further comprising a Zener diode connected below said first base terminal of said second unijunction transistor and the junction between said sixth and seventh resistors.

7. Apparatus in accordance with claim 6 wherein said sixth resistor comprises ninth and tenth resistors, in series; and wherein each of said trigger circuits further comprises a Zener diode connected between the junction of said ninth and tenth resistors and the junction between first and second silicon controlled rectifiers.

8. Apparatus in accordance with claim 1 wherein said control means comprises an operational amplifier having an inverting input, a reference input, and an output; means for applying a reference voltage between said inverting input and said reference input, a capacitor connected between said inverting input and said output; means for connecting said first resistor between said reference input and said inverting input; a second amplifier connected between said output of said operational amplifier and said first trigger circuit, and a third amplifier connected between said output of said operational amplifier and said second trigger circuit.

References Cited

UNITED STATES PATENTS

| | | | |
|---|---|---|---|
| 3,237,030 | 2/1966 | Coburn | 323—22 X |
| 3,243,689 | 3/1966 | Perrins | 323—22 |
| 3,323,034 | 5/1967 | Dubin et al. | 321—16 |
| 3,375,428 | 3/1968 | Mitchell | 321—18 |

J. D. TRAMMELL, Primary Examiner

G. GOLDBERG, Assistant Examiner

U.S. Cl. X.R.

307—261, 269, 297; 323—4, 22, 38